(12) United States Patent
Arjakine et al.

(10) Patent No.: US 9,403,245 B2
(45) Date of Patent: Aug. 2, 2016

(54) METHOD FOR TREATING TURBINE BLADES AND DEVICE THEREFOR

(75) Inventors: Nikolai Arjakine, Berlin (DE); Torsten Melzer-Jokisch, Neuenhagen bei Berlin (DE); Dimitrios Thomaidis, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 309 days.

(21) Appl. No.: 13/822,739

(22) PCT Filed: Sep. 14, 2011

(86) PCT No.: PCT/EP2011/065928
§ 371 (c)(1),
(2), (4) Date: Mar. 13, 2013

(87) PCT Pub. No.: WO2012/035060
PCT Pub. Date: Mar. 22, 2012

(65) Prior Publication Data
US 2013/0180108 A1    Jul. 18, 2013

(30) Foreign Application Priority Data
Sep. 14, 2010  (EP) .................................... 10176535

(51) Int. Cl.
*B23P 23/00* (2006.01)
*B23P 15/04* (2006.01)
(Continued)

(52) U.S. Cl.
CPC ................. *B23P 15/04* (2013.01); *F01D 5/005* (2013.01); *F01D 21/003* (2013.01); *F05D 2230/30* (2013.01); *F05D 2230/31* (2013.01);
(Continued)

(58) Field of Classification Search
CPC ....... B23P 15/04; F01D 5/005; F01D 21/003; F05D 2230/30; F05D 2230/31; F05D 2260/80; F05D 2300/611; Y10T 29/49764
See application file for complete search history.

(56) References Cited

U.S. PATENT DOCUMENTS 3,986,774 A * 10/1976 Lowrey et al. .................... 356/3
4,373,804 A *  2/1983 Pryor et al. .................. 356/3.07
(Continued)

FOREIGN PATENT DOCUMENTS

CN      1448693 A      10/2003
DE    19532767 A1       3/1997
(Continued)

OTHER PUBLICATIONS

EP1767743 Translation document by Espacenet.*
(Continued)

*Primary Examiner* — Alexander P Taousakis

(57) ABSTRACT

A method is provided for treating turbine blades having holes for discharging cooling air. A protective layer is provided and then the holes that are partly or completely closed by the protective layer are opened again. Coordinates concerning the position of the holes are acquired before the protective layer is applied using a laser triangulation sensor using a light source generating a light beam and a light detector. The data obtained is used after application of the protective layer to control a removal device for removing protective layer partly or wholly covering the holes. Each hole is measured by the light beam being shone into the hole in different positions in relation to the longitudinal mid-axis of the latter. The light beam is shone into the respective hole in a plane at at least three different angles to the longitudinal mid-axis thereof.

7 Claims, 1 Drawing Sheet

(51) Int. Cl.
 F01D 5/00 (2006.01)
 F01D 21/00 (2006.01)
(52) U.S. Cl.
 CPC ......... *F05D2230/80* (2013.01); *F05D 2260/80* (2013.01); *F05D 2300/611* (2013.01); *Y10T 29/49337* (2015.01)

(56) References Cited

U.S. PATENT DOCUMENTS

| | | | | |
|---|---|---|---|---|
| 4,637,715 | A * | 1/1987 | Idesawa | 356/3.16 |
| 6,380,512 | B1 * | 4/2002 | Emer | 219/121.71 |
| 6,723,951 | B1 * | 4/2004 | McGraw | 219/121.71 |
| 6,970,590 | B2 * | 11/2005 | Harding | 382/152 |
| 7,301,165 | B2 * | 11/2007 | Hu et al. | 250/559.45 |
| 7,578,178 | B2 * | 8/2009 | Boyer et al. | 73/112.01 |
| 8,158,428 | B1 * | 4/2012 | Krishna et al. | 436/5 |
| 8,287,183 | B2 * | 10/2012 | Shepard et al. | 374/43 |
| 2003/0123707 | A1 * | 7/2003 | Park | 382/106 |
| 2008/0165357 | A1 * | 7/2008 | Stern | G01B 11/0608 356/364 |
| 2008/0204765 | A1 * | 8/2008 | Hoffmann | G01B 11/2522 356/606 |
| 2009/0245616 | A1 * | 10/2009 | De La Ballina | A21C 9/08 382/141 |
| 2014/0053568 | A1 * | 2/2014 | Hatcher et al. | 60/773 |
| 2014/0300728 | A1 * | 10/2014 | Drescher et al. | 348/92 |
| 2014/0300729 | A1 * | 10/2014 | Drescher et al. | 348/92 |
| 2015/0354953 | A1 * | 12/2015 | Hellmann | G01B 9/02029 356/3.05 |

FOREIGN PATENT DOCUMENTS

| | | |
|---|---|---|
| DE | 10313888 A1 | 10/2004 |
| EP | 1510283 A1 | 3/2005 |
| EP | 1520652 A1 | 4/2005 |
| EP | 1544800 A2 | 6/2005 |
| EP | 1548400 A1 | 6/2005 |
| EP | 1767743 A1 | 3/2007 |
| EP | 1947477 B1 | 6/2009 |
| EP | 2085498 A1 | 8/2009 |

OTHER PUBLICATIONS

DE19532767 Translation document by Espacenet.*

* cited by examiner

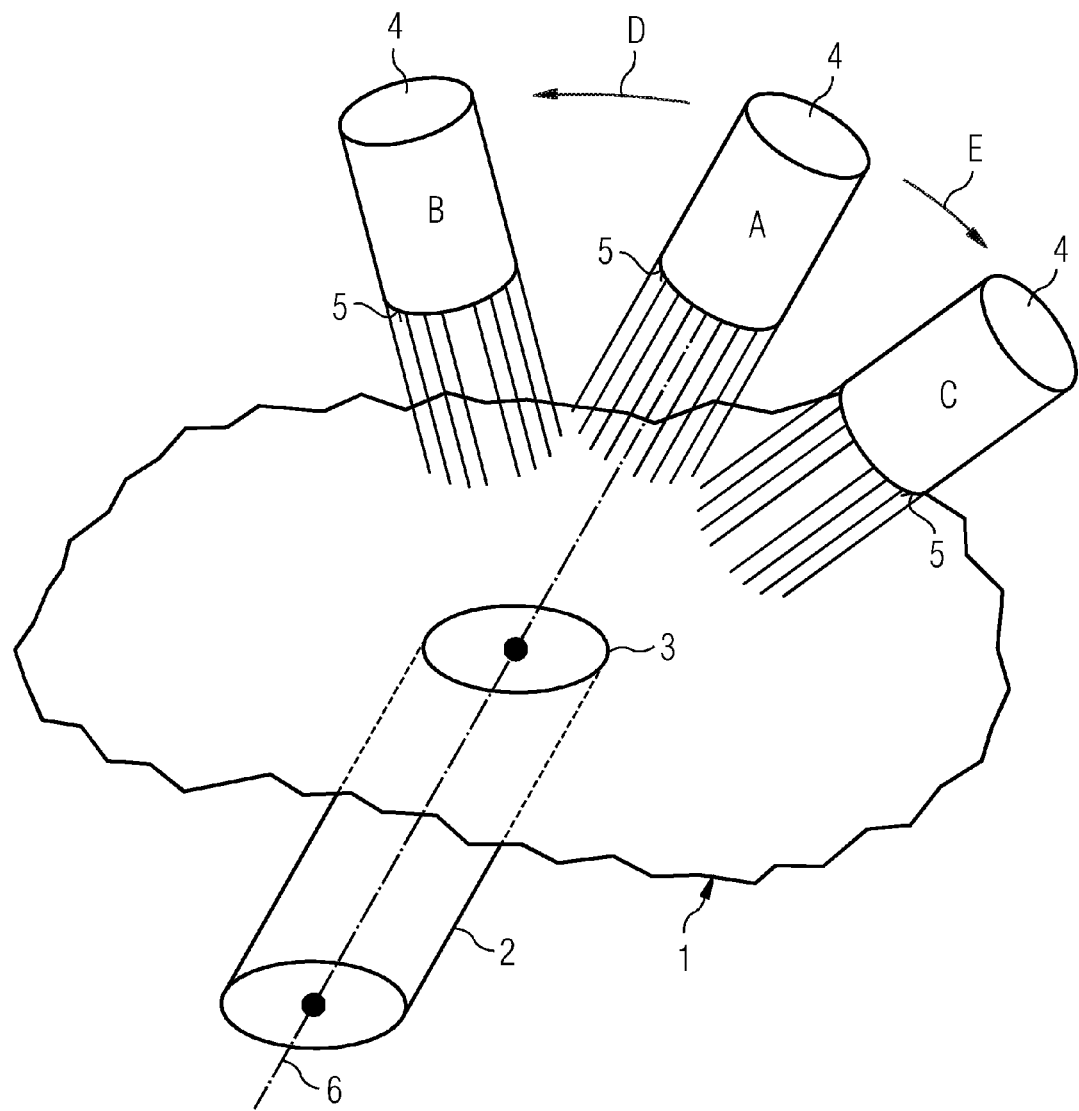

METHOD FOR TREATING TURBINE BLADES AND DEVICE THEREFOR

CROSS REFERENCE TO RELATED APPLICATIONS

This application is the US National Stage of International Application No. PCT/EP2011/065928, filed Sep. 14, 2011 and claims the benefit thereof. The International Application claims the benefits of European application No. 10176535.2 EP filed Sep. 14, 2010. All of the applications are incorporated by reference herein in their entirety.

FIELD OF INVENTION

The invention relates to a method for treating turbine blades which have cooling air holes for the discharge of cooling air, wherein a protective layer is provided and then the cooling air holes that are partly or completely closed by the protective layer are opened again. The invention further relates to a device which is suitable to determine the position of cooling air holes in turbine blades.

BACKGROUND OF INVENTION

In thermally highly stressed turbines, the turbine blades are provided on the outside with a normally ceramic protective layer. Examples of such protective layers can be gathered from EP 2 085 498 A1. With the aid of such protective layers, the turbine can be operated at higher temperatures and, in this way, the efficiency thereof can be improved. In addition, such turbine blades have cooling air holes via which cooling air, which is supplied to the cooling air holes from inside via cooling air ducts, can emerge.

The protective layers of such turbine blades are subject to wear. The protective layer must therefore be renewed from time to time. The residues of the remaining protective layer must be removed first, before the new protective layer is applied. During the process, the cooling air holes are partly or completely closed by the material of the new protective layer.

In the prior art, the opening of the cooling air holes is still done by hand with the aid of a file, the cooling air holes being identified by using slight depressions in the protective layer or small non-central holes. This process is time-consuming and therefore costly.

SUMMARY OF INVENTION

The invention is based on the object of providing an inexpensive and precise method with which the cooling air holes of turbine blades which have been partly or completely closed by a protective layer can be opened again. A further object consists in conceiving a device suitable therefor.

According to the invention, the first-named object is achieved in that coordinates concerning the position of the cooling air holes are acquired before the protective layer is applied with the aid of an optical measuring sensor based on the optical triangulation method using at least one light source which generates a light beam and at least one light detector, and in that the cooling air holes are opened by means of a removal device for removing the protective layer which partly or completely covers the cooling air holes, wherein the data determined with the aid of the triangulation method is used to control the removal device.

The basic idea of the invention is therefore to determine the position of the cooling air holes with the aid of an optical triangulation method and to use the data obtained thereby to control a removal device, which removes the areas of the protective layer that partly or completely cover the cooling air holes. The method delivers precise data concerning the position of the cooling air holes or the longitudinal mid-axis thereof, which data can then be used for the guidance of the removal device. The method ensures precise removal of the protective layer projecting into the cooling air holes and is suitable to be largely automated. In addition, the rejection rate is reduced considerably.

The triangulation method has already been known for a long time in the prior art for a variety of uses, for example for determining the surface profile of an object (DE 195 32 767 A1), for online material layer thickness determination (DE 113 888 A1, for determining the range of an object in a monitoring area (EP 1 947 477 B1) and for the inspection of rails (EP 1 548 400 A1). These documents are made the content of this application for the purpose of a more detailed description of the optical triangulation method.

The method according to the invention can in principle be applied as early as during the first application of a protective layer to a turbine blade. However it can also be applied in the context of a repair process, in which a protective layer used up by the use of the turbine blade is removed first and then a new protective layer is applied. In this case, it is expedient that the acquisition of the coordinates of the cooling air holes is carried out after the removal of the used protective layer. The new protective layer can then be applied and the areas of the protective layer that partly or completely cover the cooling air holes can be removed with the aid of the removal device according to the invention, in which the data obtained with the aid of the triangulation method is used to control the removal device.

The measuring sensor used is preferably a laser triangulation sensor since, by using such a sensor, precise data concerning the geometry and position of the cooling air holes can be obtained.

In the method according to the invention, each cooling air hole is expediently measured by the light beam being shone into the cooling air hole in different positions in relation to the longitudinal mid-axis thereof. In the process, different light reflections occur, which are detected by the light detector and converted into signal data. A data profile is created, from which the coordinates of the position of the cooling air holes or the longitudinal mid-axis thereof can be determined. Preferably, the light beam should be shone in in a plane at least three different angles to the longitudinal mid-axis of the respective cooling air hole. A still more precise data profile is obtained if the light beam is shone in in at least two different planes at respectively different angles to the longitudinal mid-axis of the cooling air hole. A multi-dimensional image processing program can be used to prepare the data obtained in the process and therefore to determine the coordinates of the position of the cooling air holes.

As far as the removal of the protective layer in the area of the cooling air holes is concerned, the invention proposes to use the laser beam from a laser removal device for this purpose.

The second object, relating to the device, is achieved according to the invention in that the device has an optical measuring sensor suitable for an optical triangulation method and having at least one light source generating a light beam and having at least one light detector, wherein the measuring sensor is fitted to a holder such that the position thereof can be varied, and has an evaluation unit which is formed in such a way that, on the basis of the signals generated by the light detector when the light beam is shone into a cooling air hole in different positions, it obtains coordinates of the position of the cooling air holes or the longitudinal mid-axes thereof. As already described above, these coordinates can be used as data for the control of a removal device.

The measuring sensor is expediently formed as a laser triangulation sensor. The holder used can be a machine tool, a coordinate measuring machine and/or a measuring arm. The light source should be adjustable on the holder in different angular positions in at least one plane. A still more precise data profile can be obtained if the light source can be adjusted on the holder in a plurality of planes and in each case in different angular positions.

According to the invention, provision is further made for light source and light detector to be combined in a unified measuring sensor, which is fitted to the holder such that the position thereof can be varied.

The evaluation device can be provided with a multidimensional image processing program for evaluating the signals generated by the light detector.

In a particularly advantageous refinement, the device includes a removal device for removing the protective layer in the area of the cooling air holes, which is formed in particular as a laser removal device which generates a laser beam. In this case, the removal device co-operates with the evaluation device in such a way that the removal device is aligned on the basis of the data about the cooling air holes that is prepared in the evaluation device. The alignment should preferably be made such that the laser beam from the laser removal device shines in coaxially and/or parallel to the longitudinal mid-axis of the respective cooling air holes.

BRIEF DESCRIPTION OF THE DRAWING

The drawing schematically illustrates an example turbine blade wherein the illustrated embodiments may be incorporated.

DETAILED DESCRIPTION OF INVENTION

In the drawing, the invention is explained in more detail by using an exemplary embodiment shown schematically. Said drawing shows a detail of a turbine blade 1, specifically the outside of a wall of this turbine blade 1. The wall is penetrated by a cooling air hole 2 which, on the outside of the turbine blade 1, ends in a discharge ellipse 3. On the inside, the cooling air hole 2 has a connection to a cooling air duct, not specifically illustrated here, which runs within the hollow turbine blade 1 and has a connection to a compressed air source.

Fitted to a holder, not specifically illustrated here, is a laser triangulation sensor 4, which has a laser source for generating a laser beam and a light detector. The laser source is aligned such that the laser beam emerges at the lower front side 5 of the laser triangulation sensor, at right angles to this front side. Beside the outlet of the laser beam there is the light detector.

When the method according to the invention is used, the laser triangulation sensor 4 is initially aligned in the position A, so that it is located largely coaxially in the suspected longitudinal mid-axis 6 of the cooling air hole 2 and shines into the latter. This can be done before the first application of a protective layer to the outside of the turbine blade 1 or during the repair of the latter following removal of the used protective layer. After that, the laser triangulation sensor 4 is pivoted once to the left and once to the right in the plane of the drawing corresponding to the arrows D, E. The positions B and C represent the respective maximum angular positions with respect to the longitudinal mid-axis 6. The laser beam generated by the laser source still shines into the cooling air hole 2 but is reflected differently as a function of the angular position. This is detected by the light detector, and the signals generated by the latter are converted into a data profile with the aid of a multidimensional image processing program. The pivoting operation as far as the positions B and C can be repeated many times in order to obtain as much data as possible. In the position in which the reflection reaches a minimum, a largely exact location of the position of the cooling air hole 2 or the longitudinal mid-axis 6 of the latter is obtained. This succeeds even more precisely if the laser triangulation sensor 4 is additionally pivoted in a plane deviating from the plane of the drawing, in particular a plane rotated through 90°, and the signals and data obtained in the process are supplied to the image processing program.

With the aid of the data profile obtained in this way, the longitudinal mid-axes 6 of the cooling air hole 2 can be found exactly following the application of a (new) protective layer to the outside of the turbine blade 1, even if the cooling air holes 2 are partly or completely closed by material of the protective layer. The data can be used for the purpose of controlling a removal device, in particular a laser removal device, in such a way that parts of the protective layer which narrow or even close the outlet ellipses 3 of the cooling air holes 2 are removed.

The invention claimed is:

1. A device for determining the position of cooling air holes in turbine blades, the device comprising:
   an optical measuring sensor suitable for an optical triangulation method, wherein the optical measuring sensor is fitted to a holder such that the position thereof can be varied,
   at least one light source generating a light beam,
   at least one light detector,
   an evaluation device which is formed in such a way that, on the basis of the signals generated by the light detector when the light beam is shone into a cooling air hole in different positions with relation to a determined longitudinal mid-axis of the cooling air hole, it obtains coordinates of the position of the cooling air holes,
   wherein the light source is adjustable on the holder in different angular positions in at least one plane, the different angular positions are based upon the determined longitudinal mid-axis, and the maximum angular positions with respect to the determined longitudinal mid-axis,
   wherein the coordinates of the position of the cooling air holes represent at least three different angular positions of the light beam with respect to the determined longitudinal mid-axis, and
   wherein the longitudinal axis of each cooling air hole is determined,
   wherein the optical measuring sensor is a laser triangulation sensor, wherein the light source and light detector are combined to form a single measuring sensor, which is fitted to the holder such that the position thereof is variable.

2. The device as claimed in claim 1, wherein the holder is a machine tool, or a coordinate measuring machine or a measuring arm.

3. The device as claimed in claim 1, wherein the light source is adjustable on the holder in a plurality of planes and in each case in different angular positions.

4. The device as claimed in claim 1, wherein the evaluation device is provided with a multidimensional image processing program for evaluating the signals generated by the light detector.

5. The device as claimed in claim 1, further comprising a removal device for removing the protective layer in the area of the cooling air holes, wherein the removal device co-operates with the evaluation device in such a way that the removal device is aligned on the basis of the data about the cooling air holes that is prepared in the evaluation device.

6. The device as claimed in claim 5, wherein the removal device is a laser removal device which generates a laser beam.

7. The device as claimed in claim 5, wherein the alignment is made such that the laser beam from the laser removal device shines into the respective cooling air hole coaxially or parallel to the longitudinal mid-axis of the latter.

* * * * *